Figure 1:
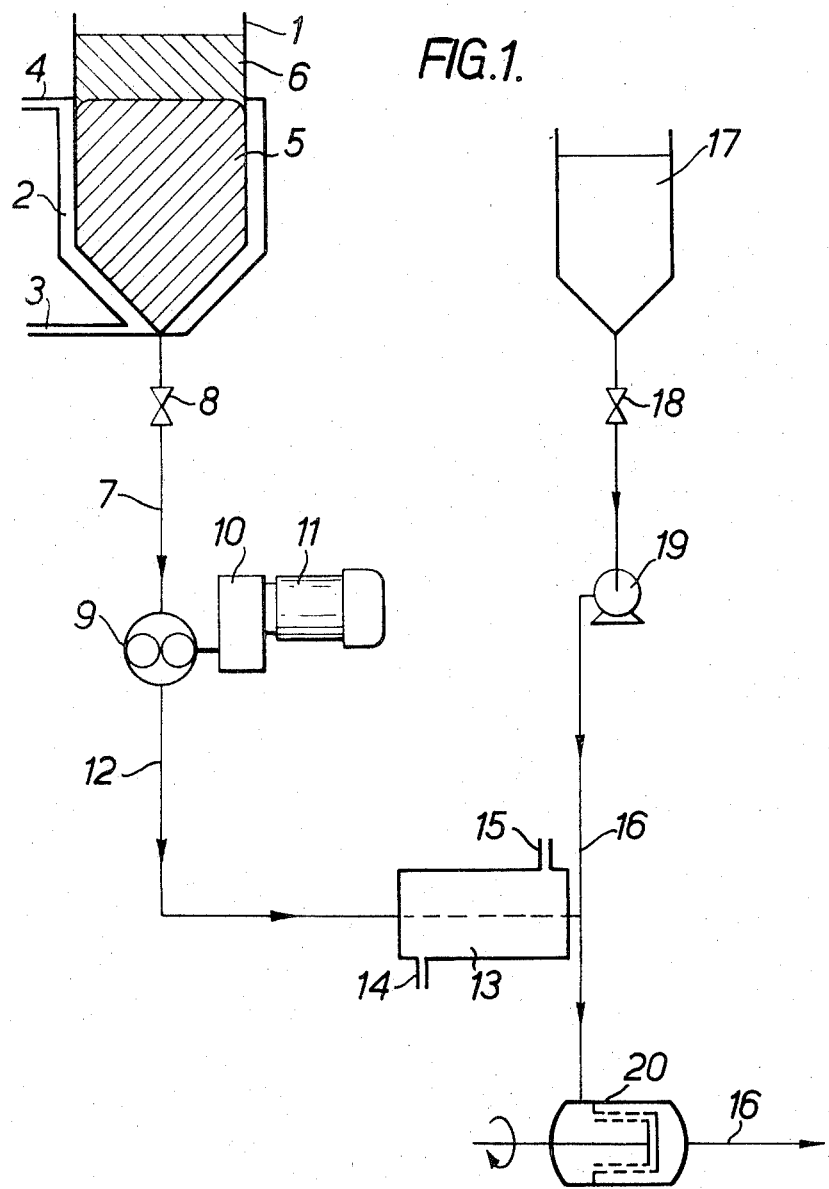

United States Patent [19]
DeGroot et al.

[11] 3,852,315
[45] Dec. 3, 1974

[54] PROCESS OF INTERESTERIFICATION OF GLYCERIDE OILS

[75] Inventors: Willem Herman DeGroot, Vlaardingen; Martin Hugh Hilder, Rotterdam, both of Netherlands

[73] Assignee: Lever Brothers Company, New York, N.Y.

[22] Filed: Oct. 16, 1972

[21] Appl. No.: 298,075

Related U.S. Application Data

[60] Continuation of Ser. No. 94,997, Dec. 3, 1970, abandoned, which is a division of Ser. No. 744,418, July 12, 1968, abandoned.

[30] Foreign Application Priority Data
July 14, 1967 Luxembourg.......................... 54108

[52] U.S. Cl............ 260/410.7, 260/214, 260/410.6, 260/491, 260/410.9 R
[51] Int. Cl................................................ C11c 3/10
[58] Field of Search.................................. 260/410.7

[56] References Cited
UNITED STATES PATENTS 2,625,484  1/1953  Dominick et al..................... 99/118
2,733,251  1/1956  Hawley et al..................... 260/410.7
2,865,759  12/1958  Weiss et al............................ 99/118

Primary Examiner—Lewis Gotts
Assistant Examiner—Diana G. Rivers
Attorney, Agent, or Firm—Lever Brothers Company

[57] ABSTRACT

The invention is concerned with the preparation of dispersions of alkali metals for example in mineral oil which may be used in particular for promoting interesterification reactions but in particular is concerned with such processes in which the dispersion is made in situ in glycerides undergoing interesterification, the alkali metal being extruded directly into the disperse liquid maintained above the melting point of the metal which is then distributed in molten form throughout the liquid. Preferably the metal is maintained in solid form near its entry into the liquid to form a seal preventing the ingress of the liquid to the supply or alkali metal and is extruded in a continuous interesterification process at a rate maintaining a limited excess of alkali metal in the reaction over the catalyst poisons present.

8 Claims, 3 Drawing Figures

PROCESS OF INTERESTERIFICATION OF GLYCERIDE OILS

This is a continuation, of application Ser. No. 94,997, filed Dec. 3, 1970, which is a divisional of application Ser. No. 744,418, filed July 12, 1968 both now abandoned.

This invention relates to processes for the interesterification of esters, particularly of edible glyceride oils. The invention also relates to the preparation of dispersions of alkali metals, which may be used to promote interesterification processes.

Interesterification is a process of radical exchange between esters which is widely applied in particular to mixtures of edible glyceride esters to improve the physiological properties of fat compositions, including margarine, in which such mixtures are employed.

Interesterification processes may be carried out in the presence of various catalytic reagents, including the alkali metal hydroxides and alcoholates, although it is not yet fully understood what is the nature of the active catalyst in the reaction.

Under the usual interesterification reaction conditions the catalytic reagents mentioned have a number of disadvantages. Alcoholates, such as sodium methylate and sodium ethylate, lead to the formation of methyl and ethyl esters, which results in an increase in product losses. Moreover, these methyl and ethyl esters cannot as a rule be completely removed during subsequent conventional deodorization processes. The hydroxides, such as sodium hydroxide, are generally introduced in the form of an aqueous solution, but at usual reaction temperatures this results in considerable losses through saponification of the esters.

It has also been proposed to carry out interesterification processes in the presence of alkali metal previously dispersed in an inert liquid such as a mineral oil or an aromatic hydrocarbon e.g. xylene.

The present invention provides a process for the preparation of dispersions of alkali metals which are suitable for use in interesterification processes. Accordingly, the present invention provides a process for the preparation of dispersions of alkali metals in liquids which comprises extruding the metal through an orifice from which it emerges directly into a disperse liquid maintained at a temperature above the melting point of the alkali metal and distributing the molten metal throughout the liquid.

The dispersions provided by the process of the invention are particularly suitable for promoting the interesterification of mixtures of esters but they may also be used in other processes requiring the presence of alkali metal dispersions.

When alkali metals have to be proportioned to liquids in principle two possibilities exist for supplying them for extrusion, namely indirect and direct proportioning.

With indirect proportioning use is made of a vessel which is entirely filled with alkali metal and which is provided with a closed lid having a liquid inlet at the top and a spring loaded valve at the bottom. The alkali metal is then displaced from the vessel through the spring loaded valve by dosing an inert liquid of a density lower than that of the alkali metal, like e.g. mineral oil, through said liquid inlet in an amount which is equivalent to the amount of alkali metal which has to be displaced through said valve. When small amounts of alkali metal of up to 10 kg/hour have to be proportioned the valve opening at a desired over-pressure of several atmospheres should be very small and it has been observed as a result of many experiments that small amounts of oxides or other impurities will seriously impede the accuracy of the proportioning. Further, owing to slipstick, which is caused by incalculable static friction and pulsations in the dosing of the mineral oil which may even lead to resonance of the whole proportioning system, standard deviations in the amount of proportioned alkali metal per unit of time of 24 to 65 percent have been observed. In the process of the present invention, therefore, the alkali metals are preferably supplied by direct displacement by means of an actuated mechanical pressure source e.g., a piston.

If the alkali metal is extruded into the disperse liquid in a molten condition its very high surface tension causes it to contract and to have at its interface with the liquid a very convex meniscus. In consequence the disperse liquid, probably on account of capillary action, enters the tube and may thus detrimentally affect the accuracy of proportioning of the alkali metal.

According to a preferred method of the present invention therefore the alkali metal is extruded into the disperse liquid in the solid state to provide a seal between the liquid and the supply of alkali metal, after which the alkali metal is distributed in the disperse liquid, preferably by means of shearing forces, in a molten condition.

Owing to the presence of solid alkali metal at its interface with the liquid a natural lock is formed between the disperse liquid and the extrusion unit, so that no liquid can enter the proportioning tube through which the alkali metal is supplied. In the proportioning tube the alkali metal may be supplied in liquid state but preferably by direct displacement in solid state by means of a piston which fits accurately in the proportioning tube, or in case of supply in liquid state by means of an electromagnetic or a rotary pump and especially a gear pump.

When liquid alkali metals are supplied by means of a rotary pump, it is of importance to choose that kind of packing material which does not react with the alkali metal, or to use a gear-spinning pump which is provided with metal seals.

Regardless of the way in which the alkali metal is supplied, it is essential, in accordance with this preferred feature of the invention that at the place where the alkali metal enters the disperse liquid it is in the solid state. When alkali metal is supplied in liquid state therefore it should be cooled at least at the place where it is discharged into the disperse liquid, to a temperature below its melting point at the existing pressure. When the alkali metal is supplied in a solid state to the tube the tube should be sufficiently thermally insulated or provided with similar cooling, again to maintain the alkali metal in a solid state where it first contacts the disperse liquid.

The alkali metal should be extruded into the disperse liquid through one or more holes in the proportioning tube.

Preferably the solid rod of alkali metal extruded into the pipe does not extend right across the pipe. The choice of the number and diameter of the holes in the proportioning tube should therefore be determined by reference to the diameter of the pipe into which the alkali metal is proportioned as well as the flow rate of the liquid therein since alkali metal is more readily distributed from fine bore holes than from wide bore holes.

When the alkali metal is supplied in the solid state, the tube may previously be filled by melting solid alkali metal in the tube, and then prior to extrusion, cooling the tube to a temperature below the melting point of the alkali metal.

In carrying out fully continuous processes by the method of the present invention it is therefore preferred to use alternately two or more distributing tubes, the alkali metal being introduced continuously into the disperse liquid from one or more tubes while the remaining tube or tubes are filled or cooled.

Although the existence of solid alkali metal in the distributing tube at the place where it is first contacted with the liquid prevents seepage of all types of disperse liquids to the supply of alkali metal, the invention is particularly of advantage when dispersions have to be prepared of alkali metal in ester mixtures intended for interesterification reactions, since the natural lock of solid alkali metal also prevents the formation of undesirable reaction products in the tube by which the effective internal diameter of said tube would be decreased, as a result of which the accuracy of the proportioning would be affected.

The process of the invention may advantageously be applied to interesterification reactions between a mixture of esters or a mixture of esters and one or more alcohols. Suitable esters can be derived from higher alcohols such as glycerol, glycols such as ethyleneglycol, propylene glycol and glycol polyalkylenes, cellulose, sorbitol, mannitol, pentaerythritol and polyvinyl alcohol or monovalent alcohols such as methanol, ethanol, propanol or butanol.

The acid radicals may be of carboxylic acids including both saturated and unsaturated fatty acids, with 2 to 26 carbon atoms.

By using the process of the present invention it is possible to interesterify edible oils without saponifying appreciable amounts of glycerides, so that interesterified products which are practically free from by-products are obtained.

By "glyceride oils" is meant for the purposes of the invention both fatty acid glycerides which are solid at ambient temperature, usually called fat, and fatty acid glycerides which are liquid at ambient temperature.

The alkali metal may be dispersed in an inert liquid, e.g. an organic solvent like xylene or toluene, and the dispersion incorporated in the mixture of esters to be interesterified. The inert liquids can be removed by means of a subsequent deodorisation treatment with live steam. Preferably however the alkali metal is dispersed directly in the ester mixture to be interesterified and the extrusion and interesterification may be carried out simultaneously.

According to a preferred feature of the invention therefore the alkali metal dispersion is prepared in situ by extrusion into the mixture of esters maintained under interesterification conditions.

The alkali metal is preferably added to the mixture to be interesterified in a quantity equal to or greater than that consumed by the catalyst poisons, so that the catalyst poisons in the mixture to be interesterified are counter-balanced by an equivalent quantity of alkali metal, expressed in gramme-equivalents. Many substances can be catalyst poisons e.g. water, fatty acids and peroxides, but the property they have in common is their tendency to combine with alkali metal into a substance which is catalytically inert or only very slightly active under the reaction conditions. As a result of numerous experiments it has been found that in the interesterification of edible oils water should not be regarded as a catalyst poison if present in amounts below 0.01 percent. Further alkali, metal soaps may be regarded as catalytically inert at a reaction temperature of less than 180°C.

Before being fed into the reactor the mixture of oils and alkali metals should be subjected to vigorous shearing stresses in order to obtain a microdispersion of catalytic reagent in the oil. It has been observed that when the alkali metals are so vigorously dispersed that at the reaction temperature they are completely dissolved within 1 minute and preferably within 20 seconds the reaction can be carried out with optimal amounts of catalytic reagents. A particularly suitable dispersion apparatus is a colloid mill known as a Willems reactron, which is inter alia described in German Pat. specification No. 1,152,003. Good results are obtained with a Willems reactron, type TDLK 3/55.

The interesterification reaction may be carried out in e.g. a cascade of stirred vessels, but is preferably carried out in a tubular reactor.

According to the catalyst concentration, the reaction temperature and the nature of the mixture to be processed, the interesterification may be completed in 1 to 10 minutes. After leaving the reactor, the reaction product is freed from any hydrogen that may have formed and is then freed from soaps and constituents of the catalyst by vigorous agitation with 10 to 30 percent by weight of water, after which the aqueous phase is separated from the reaction product.

Completely or partially interesterified products can be prepared by controlling the residence time and the quantity of active catalyst used.

The degree of interesterification of an edible oil mixture can be measured, for example, by means of dilatation measurements. For example, for a mixture of palm oil and coconut oil the dilatation at 20°C., which is represented by $D_{20}$, is a suitable measure for determining the degree of interesterification. The dilatation is determined as described in "Analysis and the characterisation of oils, fats and fat products," H. A. Boekenoogen, 1964, Interscience Publishers, London, pages 143 et seq.

The interesterification can be carried out at any temperature at which the catalyst is formed in situ with sufficient activity, from 100° – 275°C. The temperature selected depends on the nature of the catalyst and on the properties of the mixture to be esterified, but is above the melting point of the alkali metal.

Good results have been obtained by using sodium at temperatures of 100° to 140°C., preferably at 115° to 135°C.

In the interesterification of glyceride oils according to the invention preferably at least the greater part of catalyst poisons present is first removed because the amount of alkali metal required for interesterification greatly depends on the amount of catalyst poisons present to the oil. On the other hand the effect of using greater quantities of alkali metal to compensate for the presence of substantial quantities of catalyst poisons present leads to excessive soap formation which may result in an unacceptably high viscosity of the oil/soap mixture, blocking of filters with soap gel, soap formation on the inner wall of the reactor and a considerable reduction in reaction rate. Thus when a crude oil mixture having e.g. an acid value of 2 – 5 and an amount of water exceeding 0.05 percent is interesterified, at least 0.3 percent by weight of sodium is required, leading to these undesirable results. Since water and free acids are the principal catalyst poisons, it is therefore preferred to carefully neutralize the mixture to be interesterified and to reduce the water content to a level of below 0.05 percent, preferably below 0.03 percent, before interesterification.

Although the drying step can be effected in several ways, when a deacidification process by distillation is carried out, as is usual in the edible oils industry, supplementary drying is not as a rule necessary for the purpose of the present invention. Drying may alternatively be done by treating the mixture at an elevated temperature with a dry inert gas. However, drying is preferably carried out by means of an apparatus in which is maintained a reduced pressure of e.g. 10 to 50 mm. mercury and an elevated temperature of e.g. 100° to 140°C., the heated mixture of esters being atomised at the top of a chamber of the apparatus in which a vacuum is maintained to effect rapid evaporation of most of the water present. The operation can be carried out, if desired, in two or more stages. It has been found that good results are obtained by means of a double-stage vacuum drying apparatus working at pressures of 45 and 10 mm. mercury respectively, for an oil inlet temperature of 125° to 140°C.

The temperature of the liquid to be atomised and the vacuum conditions are so chosen that the moisture content of the product to be interesterified is below 0.05 percent by weight.

Prior to interesterification ester mixtures are also preferably deacidified to an acid value of less than 0.3. By "acid value" is to be understood the number of milligrammes of potassium hydroxide which it take to neutralize 1 gram of the mixture to be interesterified. The acid value is determined by the process described by H. A. Boekenoogen "Analysis and characterisation of oils, fats and fat products," Volume I, 1964, Interscience Publishers, London, pp. 23–24. Since the determination is carried out at ambient temperature in a short space of time, the esters are not saponified, so that an acid value of 0 is obtained in the absence of free acids. The mixture to be interesterified can be deacidified by using a process of deacidification by distillation in vacuo, but it can also be done by direct contact with an alkaline solution, by which soaps are formed which can be separated by the difference in specific gravity between the oil and the soap. Such alkali deacidification can be carried out by means of a 0.2 to 8N sodium hydroxide solution.

Deacidification can be carried out continuously in centrifugal apparatus which ensure a brief period of contact between the oil and the alkali solution. Moreover, continuous deacidification can also be carried out by mixing the product rapidly with the alkaline solution, then washing the mixture in a packed column. However, deacidification is preferably carried out by passing the oil to be deacidified co- or countercurrently through a packed column filled with the alkaline solution, if necessary at a raised pressure and at a temperature of 80° to 160°C., while the oil constitutes the dispersed phase. Such deacidification processes are described in Dutch Pat. application Nos. 6503471 and 6603470.

Figure 2:
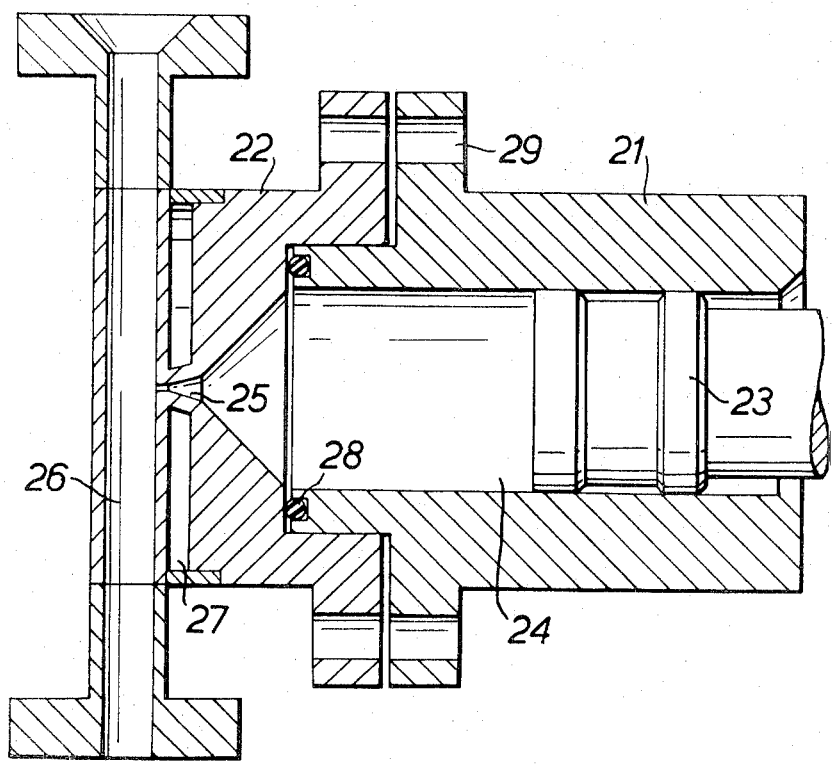
Figure 3:
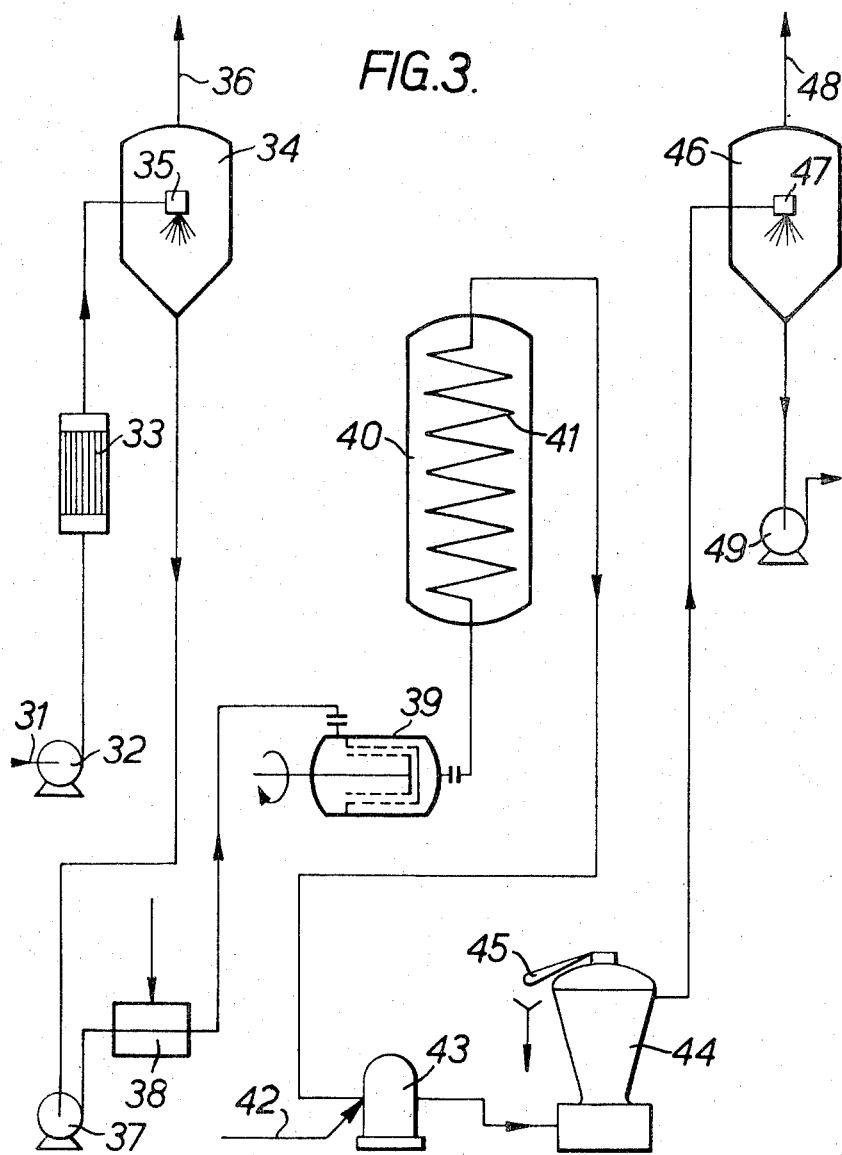

The process according to the invention will now be described with reference to the attached drawings in which:

FIG. 1 is a flow diagram of a process for preparing dispersions of an alkali metal in accordance with the invention, in which the alkali metal is supplied in liquid state and solidified before contact with the disperse liquid, FIG. 2 is a vertical section through a proportioning device for extruding the alkali metal, in which the alkali metal is supplied in solid state and FIG. 3 is a flow diagram of a continuous interesterification plant in which the method of the present invention is applied.

In FIG. 1 a storage vessel for liquid alkali metal 1 is provided with an external heating jacket 2 for maintaining the vessel above the melting point of the alkali metal by means of a heat transfer medium which is fed at inlet 3 and removed at outlet 4. On top of the liquid alkali metal 5 a layer of paraffin oil 6 is present which prevents oxidation of the liquid alkali metal.

By means of a gear-spinning pump 9 the molten alkali metal is transported via valve 8 and pipe 7 into and through a proportioning tube 12.

The flow rate of the liquid alkali metal is adjusted by means of the variator 10 between the gear pump 9 and the electric motor 11 driving it.

The proportioning tube 12 is provided with heat exchanger 13 through which cooling medium is passed from inlet 14 to outlet 15 to solidify the alkali metal in the proportioning tube passing through heat exchanger 13.

The solidified alkali metal is extruded under the delivery pressure of the gear pump 9 into a pipe 16 through which the disperse liquid is pumped at a temperature above the melting point of the alkali from storage tank 17 via valve 18 by means of pump 19.

The mixture of disperse liquid and alkali metal is pumped through colloid mill 20 in which the alkali is distributed to form a dispersion of the alkali metal in the disperse and transferred through liquid from pipe 16 into container vessels or may be continuously transferred to a process in which it is required.

Instead of supplying the alkali metal in liquid state by means of a rotary pump as shown in FIG. 1, it may be supplied in solid state by means of an apparatus as shown in FIG. 2. Referring to FIG. 2, the cylindrical proportioning tube 21 is joined at 29 by bolts (not shown) to the cylinder head 22. The proportioning tube 21 is provided with a hydraulically or mechanically operated piston 23 and a packing ring 28.

The cylinder head 22 is provided with an outlet hole 25 through which solid alkali metal inside the extrusion tube at 24 can be extruded by means of the piston 23 into disperse liquid flowing through pipe 26, which is connected to similar equipment, e.g. pump and colloid mill, as is shown in FIG. 1.

The cylinder head 22 is also provided with a cooling jacket 27 to prevent the alkali metal inside the cylinder head 22 from melting by circulation of cooling fluid in jacket 27.

A continuous interesterification process using the method of the present invention will now be described with reference to FIG. 3.

A mixture of glyceride oils to be interesterified is introduced at 31 by a pump 32 and transferred from a heat exchanger 33, where it is pre-heated to a temperature of 125° to 140°C., to a vacuum drying apparatus 34, where it is atomised by means of an atomiser head 35. The vacuum drying apparatus 34 is connected at 36 to a vacuum plant, not shown, which enables a pressure of 10 to 50 mm mercury to be maintained in the drying apparatus. The mixture reduced in this way to a moisture content of below 0.05 percent by weight is conveyed by the pump 37 to the reactor 41. Before the product to be interesterified passes into the reactor the quantity of alkali metal required is added at 38 and is finely distributed in the mixture by a homogenizer 39. The mixture is then passed into the tubular reactor 41, which is in the form of a coil provided with heat insulation and a heating jacket 40 which enables the temperature to be maintained at the required level. The residence time in the reactor can be regulated between 1 and 10 minutes by adjusting the flow of the liquid. The interesterified product is then mixed in the mixer 43 with 10 – 30 percent by weight of water, introduced at 42, in order to extract the soaps formed and the catalyst residues by washing. In the centrifugal apparatus 44 the undesirable byproducts are extracted at 45 whilst the interesterified product is atomised by means of the atomiser head 47 in the drying apparatus 4 which is connected at 48 to a vacuum plant. The drying apparatus 46 can be maintained at a pressure of 45 mm mercury so that the interesterified product is dried to a water content of 1 to 0.1 percent by weight. The purified and dried interesterified product is then extracted by the pump 49 from the atomising chamber.

The process of the invention is further illustrated by the following examples.

EXAMPLE 1

In this example a lithium dispersion was prepared using the apparatus shown in FIG. 1.

Lithium having a melting point of 180°C. was first heated under a light mineral oil film to a temperature of 200°C. and then supplied by means of a gear-spinning pump with a capacity of 220 grams/hour through a proportioning tube discharging directly into a graining bowl provided with a heating jacket, a revolving rake for dispersing the lithium with high shearing forces and inlet means for continuously metering mineral oil into the bowl and an outlet for the lithium dispersion prepared. The proportioning tube was cooled to a temperature of 50° – 150°C. where the lithium is first contacted with the oil and mineral oil in the graining bowl was maintained at a temperature of 210° – 230°C. A product having particle sizes of lithium ranging from 15 – 50 microns was obtained then the lithium and oil were continuously fed at a weight ratio of 1:3, the flow rates of both lithium and mineral oil being so adjusted that an average residence time in the bowl of 10 minutes was obtained.

EXAMPLE 2

A sodium in xylene dispersion was prepared by supplying liquid sodium, having a melting point of about 98°C., through a proportioning tube by means of the same gear-spinning pump as was used in Example 1 and illustrated in FIG. 1.

The sodium storage vessel, the spinning pump and the greater part of the proportioning tube were kept at a temperature of 105° – 110°C.

The proportioning tube discharged directly and perpendicularly into a pipe through which xylene was flowing at a temperature of 105° – 110°C.

The end of the proportioning tube was cooled to a temperature of 50° – 80°C. adjacent to the place where the sodium first contacted the xylene to provide a seal between the xylene stream and the supply of liquid sodium.

The extruded sodium together with the stream of xylene, in a weight ratio of 1:3 and at a temperature of 105° – 110°C. was continuously fed into a colloid mill where the sodium was distributed throughout the xylene.

The product leaving the colloid mill was cooled to ambient temperature and was either packed in vessels or transferred to a process in which sodium dispersions were required for catalytic purposes.

EXAMPLE 3

This example illustrates the interesterification of a mixture of pale oil and coconut oil in a weight ratio of 60:40 in a plant as shown in FIG. 3. Before mixing, the oils were neutralized with an aqueous sodium hydroxide solution of a normality of 0.8 M, and then spray-dried in a vacuum chamber at a pressure of 10 mm mercury at a temperature of 125°C. The oils were then mixed.

The relevant characteristics of the oil mixture obtained were as follows:

| | |
|---|---|
| Water content: | 0.008% |
| Acid value: | 0.13 |
| Peroxide value: | 0.8 |
| Dilatation value at 20°C. | 240 |

390 kg/hour of the dried oil mixture was pumped through the apparatus in which sodium was extruded in the oil mixture by means of the apparatus shown in FIG. 2 at the rate of 0.072 kg/hour, i.e., 0.0184 percent by weight, corresponding to 0.001 percent in excess of the equivalent amount of catalyst poisons, based on the total amount of oil.

The sodium was extruded at a pressure of about 150 kg/cm$^2$ through a hole having a diameter of 2 mm of an extruder provided with a piston of 40 mm diameter.

The extruder was thermally insulated to retain the sodium in the extruder in solid state.

The extruded sodium was subsequently dispersed in the mixture of oils by means of a Willems Reactron of the type TDLK 3/55 provided with rotors 10 cm. in diameter, spaced at 2 mm and revolving at 2,910 rpm. After an average residence time of 4 seconds in the colloid mill no dispersed sodium particles could be observed with the naked eye, which probably means that such a fine dispersion was obtained that the surface of the sodium was increased to such a degree that the active catalyst was almost instantaneously prepared.

The dispersion obtained was continuously fed into a tube reactor.

The residence time in the reactor was 1.15 minutes. The degree of interesterification was measured by means of the dilatation value at 20°C. $\phi_{20}$). The product leaving the tube reactor had a $D_{20}$ of more than 610, which means that the interesterification was completed. The interesterified product was then freed from the catalyst residues by a washing treatment with 10 percent by weight of fresh water. Soap formed during the reaction was removed by centrifuge and the interesterified product was dried by spraying into a vacuum chamber.

EXAMPLE 4

In this example two mixtures a) and b) of palm oil and conconut oil in the same weight ratio as was used in Example 3 were prepared, both being dried under the same process conditions as described in Example 3 but only the blend a) was neutralized.

The relevant characteristics of the oil blends were:

|  | a | b |
|---|---|---|
| Water content: | 0.01% | 0.01% |
| Acid value: | 0.2 | 2.0 |
| Peroxide value: | 0.8 | 0.8 |
| Dilatation value at 20°C. | 240 | 240 |

Sodium was continuously proportioned in each case directly and in solid state from a proportioning tube fitted with extrusion piston 25 cm diameter through 5 extrusion holes 1.4 mm in diameter into the oil blend, maintained at 120°C. and supplied at 6 tons/hour. The sodium was distributed by means of a Willems Reactron.

The sodium was extruded into oil blend (a) at the rate of 3 kg/hour, corresponding to 0.05 percent in excess of the above catalyst poisons and into oil blend (b) at the rate of 6 kg/hour, corresponding to 0.1 percent excess.

The residence time in the tube reactor for both oil blends was 2 minutes.

The oil blends were interesterified in the plant shown in FIG. 3. The interesterification of blend (a) continued without interruption for 5 days, but the interesterification of blend (b) was stopped once every two days for removing impurities from the reactor and the pump filters owing to the high soap content of the product in the tube reactor. The product was purified as described in example 3.

Throughout these operations samples indicated dilatation values of over 600, showing that the products were fully interesterified.

What is claimed is:

1. An interesterification process in which a mixture to be interesterified and consisting essentially of a glyceride oil is maintained below its boiling point at a temperature of from about 100° to about 275°C. and an alkali metal having a melting point substantially below the temperature of the interesterified mixture is extruded directly to melt therein, maintaining the alkali metal in solid form at least in the immediate vicinity of its point of entry into the interesterification mixture to provide a seal of solid alkali metal between its supply and the interesterification mixture, distributing the molten alkali metal throughout the interesterification mixture and separating undesired soap from the interesterified product.

2. A continuous interesterification process according to claim 1 wherein the components of the interesterification mixture are preheated and admitted to an interesterification zone from which the interesterified products are removed and into which the alkali metal is extruded at a rate sufficiently to maintain an alkali metal concentration in the reaction zone which is at least equal to and up to 0.1 percent in excess of the concentration of catalyst poisons therein.

3. Process according to claim 2 wherein the acid value of the interesterification mixture is below 0.3 and its moisture content is below 0.05 percent.

4. Process according to claim 1 wherein the interesterification mixture is maintained in the reaction zone at a temperature of from 100° to 140°C.

5. Process according to claim 1 wherein the residence time in the reaction zone is from about 1 to about 10 minutes.

6. Process according to claim 1 wherein the alkali metal is dispersed substantially completely throughout the interesterification mixture within about 1 minute.

7. Process according to claim 1 wherein the alkali metal is sodium.

8. Process according to claim 1 wherein the interesterification mixture consists essentially of a mixture of glyceride oils.

* * * * *